United States Patent
Kothe et al.

(10) Patent No.: US 8,943,184 B2
(45) Date of Patent: Jan. 27, 2015

(54) ABSTRACT REPRESENTATION AND PROVISIONING OF NETWORK SERVICES

(75) Inventors: Sridhararao V. Kothe, Bellundur (IN); Sreenivas Devalla, Union City, CA (US); Satyanarayana D V Raju, San Ramon, CA (US); Nakka Siva Kishore Kumar, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 501 days.

(21) Appl. No.: 13/334,268

(22) Filed: Dec. 22, 2011

(65) Prior Publication Data

US 2012/0173691 A1 Jul. 5, 2012

Related U.S. Application Data

(60) Provisional application No. 61/429,139, filed on Jan. 2, 2011, provisional application No. 61/429,147, filed on Jan. 2, 2011, provisional application No. 61/429,148, filed on Jan. 2, 2011.

(51) Int. Cl.
*G06F 15/173* (2006.01)
*H04L 12/24* (2006.01)
*H04L 12/26* (2006.01)

(52) U.S. Cl.
CPC ........ *H04L 41/0226* (2013.01); *H04L 41/0266* (2013.01); *H04L 41/022* (2013.01); *H04L 43/04* (2013.01); *H04L 43/045* (2013.01); *H04L 43/062* (2013.01); *H04L 43/065* (2013.01)
USPC ............ 709/223; 709/224; 709/225; 709/226

(58) Field of Classification Search
None
See application file for complete search history.

(56) References Cited

U.S. PATENT DOCUMENTS

| | | | | |
|---|---|---|---|---|
| 7,293,063 B1 * | 11/2007 | Sobel | ............ | 709/206 |
| 7,533,144 B2 * | 5/2009 | Kassab | ............ | 709/203 |
| 7,620,724 B2 * | 11/2009 | Weisman et al. | ............ | 709/227 |
| 7,739,341 B1 * | 6/2010 | Sobel | ............ | 709/206 |
| 7,810,041 B2 | 10/2010 | Rao et al. | | |
| 7,823,069 B1 | 10/2010 | Tanner et al. | | |
| 2006/0031404 A1 * | 2/2006 | Kassab | ............ | 709/218 |
| 2006/0184661 A1 * | 8/2006 | Weisman et al. | ............ | 709/224 |

* cited by examiner

*Primary Examiner* — Brian P Whipple
(74) *Attorney, Agent, or Firm* — Edell, Shapiro & Finnan, LLC

(57) ABSTRACT

A network management device connects to a device on the network, receives a trigger for an operation command, supplies to the device a command line interface command for the operation command, wherein a randomly generated string is included at the end of the command line interface command. The network management device receives the output of the operation command from the device, detects the end of the operation command output and parses the output using an XML-based parser. XML based configuration files are used for configuration of different network devices. XML based report files are used to generate different network reports.

28 Claims, 10 Drawing Sheets

```
Input Command : show cdp neighbors<CR><unique string>        400
Output :
3500-1 #show cdp neighbors
Capability Codes: R - Router, T - Trans Bridge, B - Source Route Bridge
                  S - Switch, H - Host, I - IGMP, r - Repeater, P - Phone Device ID      Local Intrfce    Holdtime    Capability    Platform       Port ID
switch-3500-1.laop
               Gig 0/1          171         T S           WS-C3508G-Gig 0/8
PAriLocalRouter.pari-net-com
               Fas 0/1          160         R S I         WS-C3750G-Gig 1/0/19
3500-1#<unique string>
       400
```

FIG.4

```
Cisco#show inventory
NAME: "Switch System", DESCR: "Cisco Systems, Inc. WS-C4506 6 slot switch "
ID: WS-C4506          , VID: V06, SN: FOX10450V54
NAME: "Linecard(slot 1)", DESCR: "Supervisor V-10GE with 2 10GE X2 ports, and 4 1000BaseX SFP ports"
ID: WS-X4516-10GE    , VID: V05, SN: JAE102347T0
Name: "Linecard(slot 2)", DESCR: "10/100/1000BaseT (RJ45) with 48 10/100/1000 baseT ports"
ID: WS-X4548-GB-RJ45 , VID: V04, SN: JAE10296RDZ
NAME: "Fan", DESCR: "FanTray"
ID: WS-X4596          , VID: V03, SN: NWG10430A5X
NAME: "Power Supply 1", DESCR: "Power Supply ( AC 4200w )"
ID: PWR-C45-4200ACV  , VID: V02, SN: SNI1038C13W
NAME: "Power Supply 2", DESCR: "Power Supply ( AC 4200w )"
ID: PWR-C45-4200ACV  , VID: V02, SN: SNI1046C13B Cisco#<UniqueString>
```

ABSTRACT REPRESENTATION AND PROVISIONING OF NETWORK SERVICES

CROSS REFERENCE TO RELATED APPLICATIONS

This application claims priority to U.S. Provisional Application Nos. 61/429,139, 61/429,147 and 61/429,148, each filed on Jan. 2, 2011, the entirety of each of which is incorporated herein by reference.

TECHNICAL FIELD

The present disclosure relates monitoring network services on network devices in a network management system.

BACKGROUND

In a network, there are many different kinds of network devices, each performing different types of functions. For example, a router routes/forwards packets from an external network to an internal network, and vice versa. A switch connects different types of networked devices like printers, different types of servers and computers in a network. A network device may support a feature like network address translation, firewall or domain name services, etc.

Different types of network management system software are employed to configure and monitor different network management systems. Network management software is typically tied to the devices with which the software can operate. When the network device software version or the vendor of a network device changes, the network management software typically cannot incorporate those changes. For example, if a customer is using network devices manufactured by Company A and then decides to buy and deploy network devices from Company B, a single network management software product will not work with network devices of both Company A and Company B.

Additionally, network management is usually performed from a central location with a collection of modules running at different network nodes assisting a central management node. A client software instance needs to be installed on the network devices for them to be able to talk to the management device. Customers typically do not want to install monitoring or configuring software on their network devices because these modules can slow the normal operations of the network devices.

BRIEF DESCRIPTION OF THE DRAWINGS

FIG. 4 shows an example of a show command with end of command detection.

FIG. 6A is a diagram providing a listing of output of an example operation command.

DESCRIPTION OF EXAMPLE EMBODIMENTS

Overview

In a network management and configuration system, one or more network devices can be monitored or configured using different operation commands. An input from the user or automatic scheduling can trigger the network management device to invoke execution of an operation command. The network management device connects to one or more network devices. After establishing a connection, the network management device supplies the operation command with a randomly generated string at the end of the command. The network device executes the command and sends the response back to the network management device with the randomly generated string at the end of the output. The network management device detects the end of the command output based on the randomly generated string. The network management device then proceeds to parse the command output using an XML based parser.

Example Embodiments

Figure 1:
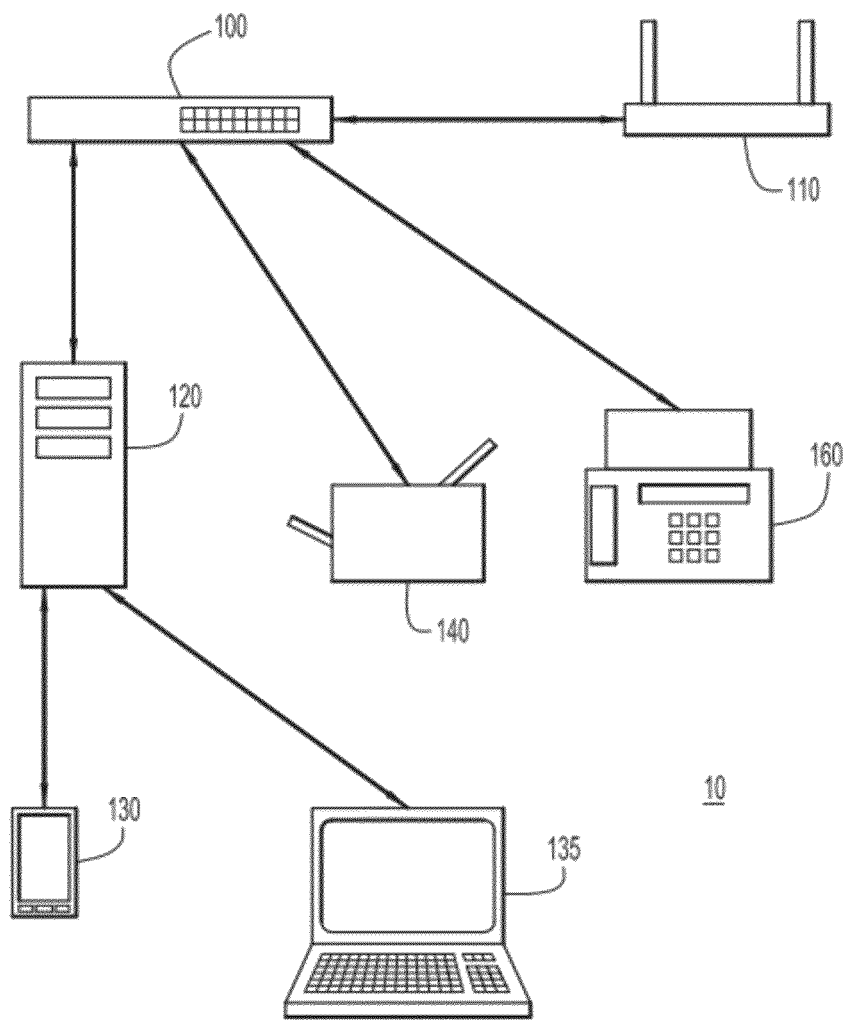
FIG. 1 is a diagram depicting an example of a network with different types of network devices.

Referring first to FIG. 1, a network is shown generally at reference numeral 10. The network 10 can incorporate the network management techniques disclosed herein. The different devices in the network 10 are logically connected to all the other devices in the same network. The arrows shown in the FIG. 1 are for example only and do not depict all the possible connections and interconnections between devices. For example router 100 is shown to be connected to a wireless router or switch 110. A server 120 is connected to the router 100. For example, the server 120 can be a database server, webserver or email server, etc. FIG. 1 shows one server 120 by way of example only. A typical network may have numerous servers. Similarly, network client devices in the network 10 may include smart phone 130 and computer 135. A network printer 140 and network fax 160 are also connected to the router 100. The network management software described herein can be executed on any device on the network 10. For example, the network management software can run on a network device, network server or network client.

Figure 2:
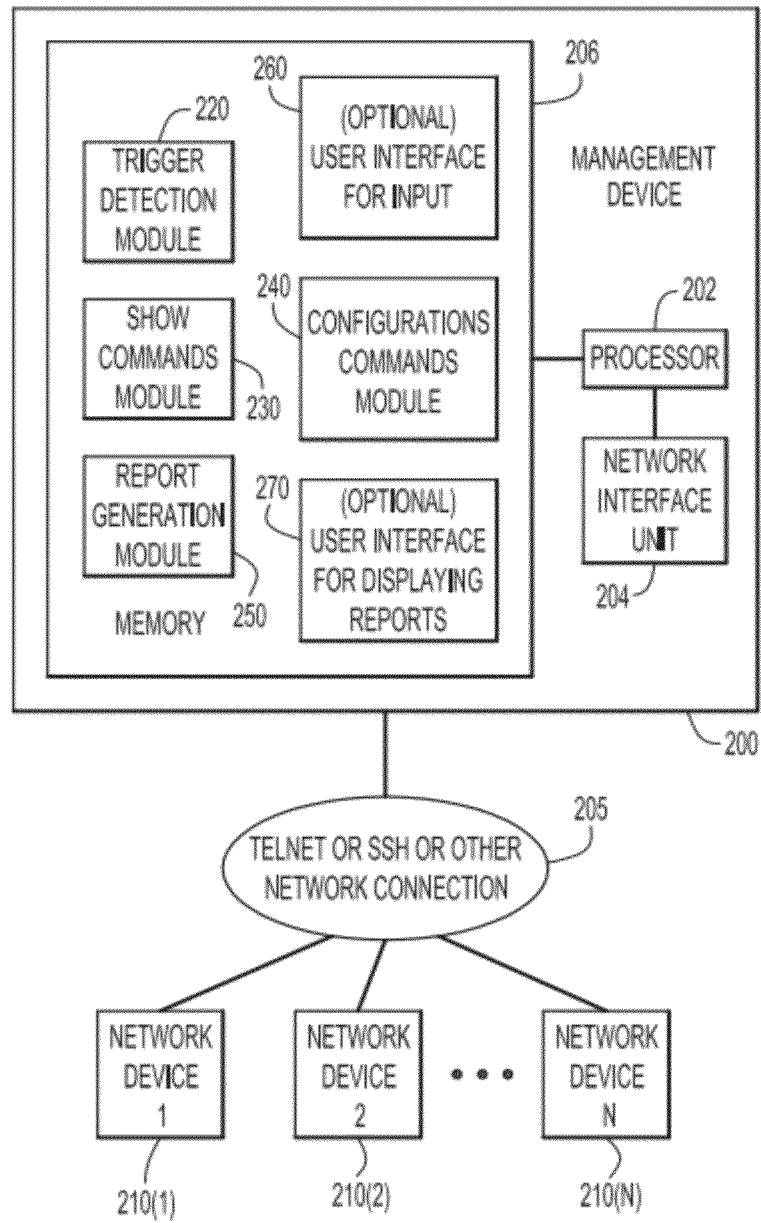
FIG. 2 is a block diagram showing an example of a management device communicating with different network devices.

Reference is now made to FIG. 2 for a description of a block diagram showing different modules within a network management device and its communication with different network devices. The network management device 200 is connected to one or more network devices 210(1), 210(2), ... 210(N). The network management device 200 can connect to any of the network devices using any widely used and available network application programming interface over network 205. For example, the network management device 200 can connect using telnet for an unsecure connection and Secure Shell (ssh) for a secure connection. The network management device 200 does not have any special client code executing on any of the network devices. The network devices 210(1), 210(2), ..., 210(N), treat a connect request from the network management device 200 with the same response as it would treat a user triggered connect request. The network devices 210(1), 210(2), ..., 210(N) do not have the intelligence to determine whether the connect request is coming from a user or automated programmatically through a network management device. The intelligence for performing the techniques described herein resides within the network management device 200.

To this end, the network management device 200 comprises a processor 202, a network interface unit 204, and memory 206. The processor 202 may be a microprocessor, microcontroller or a collection or microprocessors or microcontrollers. The processor 202 executes software, i.e., computer executable instructions, stored in memory 206, to perform various operations including those of the modules shown and described herein. The network interface unit 204 is a device that enables communications over network 205. For example, the network interface unit 204 is an Ethernet card.

Memory 206 may comprise read only memory (ROM), random access memory (RAM), magnetic disk storage media devices, optical storage media devices, flash memory devices, electrical, optical, or other physical/tangible (non-transitory) memory storage devices. Thus, in general, the memory 206 may comprise one or more tangible computer readable storage media (e.g., a memory device) encoded with software comprising computer executable instructions and when the software is executed (by the processor 202) it is operable to perform the operations described herein.

Specifically, the memory 206 stores executable instructions for a trigger detection module 220, a show commands module 230, a configuration commands module 240, a report generation module 250, an optional user interface for input module 260, and an optional user interface for display module 270. These modules are described hereinafter.

Once a connection is established with a network device, the network management 200 device uses one or more of the software modules 220-270 shown in FIG. 2 to perform different functionality and features. The network management device 200 responds to a trigger that is based on an automatic scheduler or based on user input. The trigger defines the current task to be carried out by the network management device 200. The network management device 200 selects an operation command based on the trigger request. The processor 202 executes instructions of the trigger detection module 220 to detect to different triggers and select the operation command to be executed.

One type of network command is a status or "show" command and another type of network command is a configuration command. The network management device 200 executes the show commands module 230 to handle operation of show commands and executes the configuration commands module 240 to handle operation of the configuration commands. The network management device 200 supplies the operation command with a randomly generated string and sends it to a network device after establishing a connection with the network device. The response from the network device is then handled by the show commands module 230 or the configuration commands module 240.

The parsed output from the show commands module 230 or configuration commands module 240 is then given to a report generation module 250. The report generation module 250 generates reports based on an XML defined report format. The report may be of a simple format, and indicates whether the configuration was successful or whether the configuration failed. There may be different types of reports based on the user request.

The user interface for input module 260 is an optional module. The network management device 200 can be configured automatically by a task scheduler and configuration files that are used to configure the network management device 200 or through a user interface. For example, a user may schedule network management operations to be performed on one or more network devices once a day, weekly or monthly. In addition, the network management device 200 may be configured to generate an end of life cycle report for all the devices on the network. Once the user schedules such a task, the network management device 200 does not require any further user interface/inputs to trigger an event. Another scenario is when a user using an HTML-based interface or a graphical user interface, invokes certain operation commands. These user interface commands define the operation command and request the network management device 200 to invoke them on the selected network devices. The user interface for input module 260 may be implemented in any programming language, including and not limited to, object oriented programming languages like Java and C++.

The user interface for displaying reports module 270 is another optional module. Once a report is generated, the network management device 200 is capable of sending the report by email, fax or text messaging using any now known or hereinafter developed notifications techniques in the field. The user may also choose to have a user interface displaying the reports. This user interface could be driven by HTML pages on a web server or through a software graphical user interface using a Java application programming interface or any other graphical user interface software.

The modules shown in FIG. 2 may reside on the management device. However, it is not necessary or essential for all the modules to reside on a single device. The functionality of the network management device 200 may be divided into or distributed across two or more devices, where the devices can communicate with each other any heretofore known or hereinafter developed communication techniques.

Figure 3:
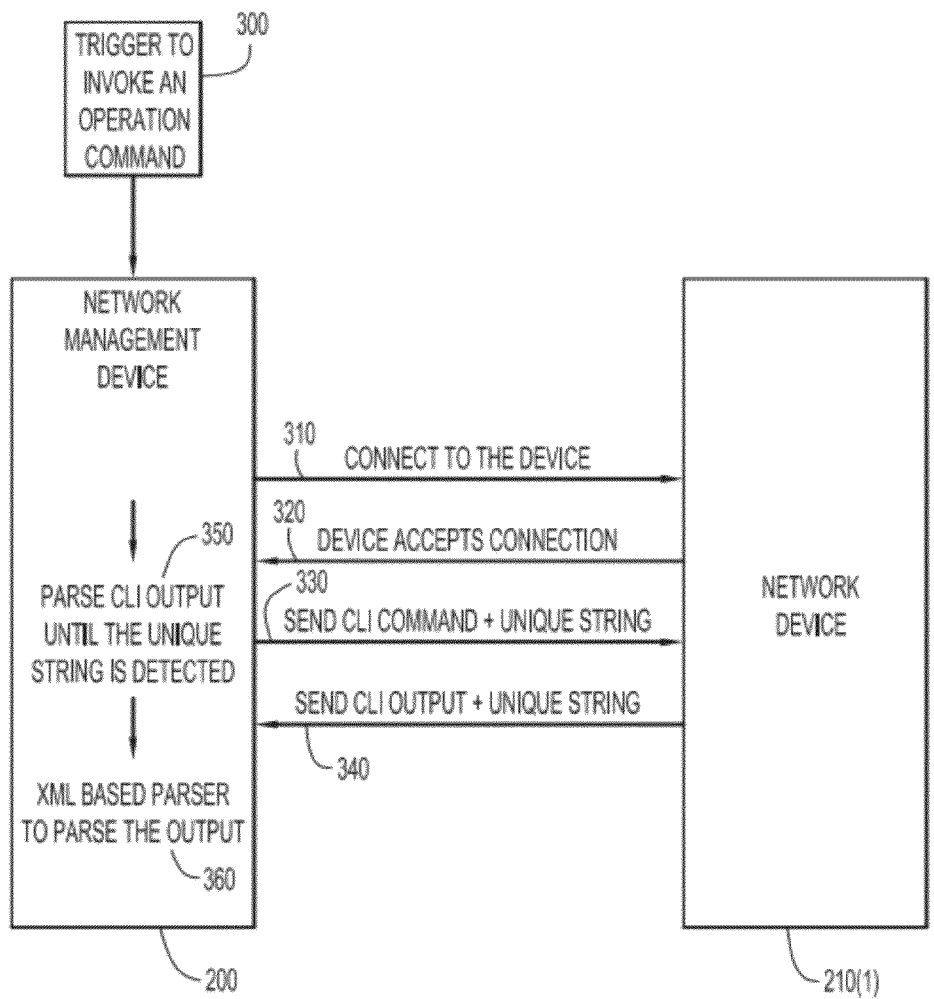
FIG. 3 is a diagram generally depicting a flow to detect an end of command for an operation command output.

Reference is now made to FIG. 3 for a description of a flow to detect end of the command output. These operations may be part of the functions of the trigger detection module 220, for example. At 300, a trigger to invoke an operation command occurs. The management device 200 then begins the exchange of messages with a network device, e.g., the network device 210(1). First, at 310, the network management device 200 makes a request to connect to the network device 210(1). The network device 210(1) can accept the connection or reject it. If the network device 210(1) rejects the connection then the network management device returns an error or optionally generates an error report for that network device. If the network device 210(1) accepts the connection as shown at 320, the network management device 20 then sends the operation command, e.g., in the form of a Command Line Interface (CLI) command, followed by a carriage return <CR>, followed by a randomly generated unique character string at the end of the operation command, at 330. The network device 210(1), at 340, then generates the output of the operation command that it executed and sends the output of the operation command back together with the same randomly generated unique string at the end of the output of the operation command. The network management device 20 can determine that the output is finished or complete by detecting the randomly generated unique string that it sent with the operation command. There is no special software stored on the network device 210(1) to send back the output with the unique string appended at the end of the output; it is automatically added to the output because of the way it was included with the command sent by the network management device 200. At 350, the network management device 200 then parses the output of the operation command in order to detect the randomly generated unique string. At 360, the network management device 200 then supplies only the operation command output to an XML based parser to parse the output for analysis, etc. The XML based parser may be configured to parse different operation command outputs with XML files using anchors and regular expressions irrespective of whether the output is free style or in tabular form.

FIG. 4 shows an example of an input operation command with a unique string 400 at the end. The unique string is shown at 400 at the end of the output received from the network device after the "#" symbol. Thus, all of the content prior to the unique string can be parsed as the actual output generated by the network device in response to the operation command sent by the network management device 200.

Currently, there is no easy way to detect end of command output when executing commands programmatically on network devices. For example, network devices manufactured and sold by Cisco Systems, Inc., have different operating systems, namely, IOS/IOSXR/CatOS/NXOS. The network management applications need to learn about the different submodes and command prompts before attempting to execute the CLIs on the device. The learned command prompts are used to identify the end of the command output. In some cases, the same command can be executed in different submodes. A developer also needs to identify the submode of a CLI session before attempting to read the command output and identify the end of command output.

Appending a Carriage Return <CR> and a "unique string" to the end of the command is used to detect the end of command output generated and returned by the network device to the network management device. A CLI session allows a single command at a time from a single CLI session. Even if multiple commands are sent simultaneously to the network device, the network device will execute the commands in serial. If a command is sent to the device along with a <CR> and a unique string, the device executes the command, dumps the output and echoes the unique string at the end of the command output. When reading the command output, the software application that parses the output looks for and detects this "unique string" to reliably identify the end of the command output. There are numerous techniques available in the art to generate various unique character strings for use in connection with these techniques.

By using the technique described above in connection with FIGS. 3 and 4, the process of detecting the end of the output becomes very simple and with very little effort from a software programmer. There is no need to learn about different submodes, different command prompts or keeping track of the submode of a CLI session. The developer merely appends <CR> and a unique string to the command before sending to the device. The network device dumps the command output and echoes the unique string on a new line at the end of the command output. The parsing software detects the unique string to identify the end of the output.

Figure 5:
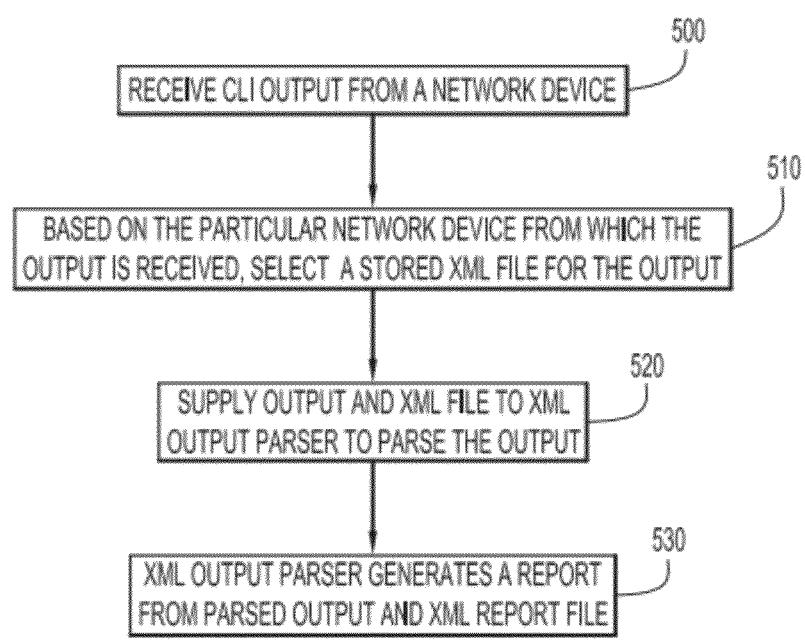
FIG. 5 is a flow chart showing report generation and use of Extensible Markup Language (XML) files for parsing the output and report generation.

Reference is now made to FIG. 5 that shows a flow chart for use of XML files to parse network device output and generate reports. These operations are performed when the instructions for the report generation module 250 are executed on the network management device 200. At 500, the management device parses the CLI output received from a network device. In so doing, the management device may detect and remove the unique string at the end of the output. Based on the CLI output and the particular network device from which the output is received, at 510, the management device selects a stored XML definitional file for that particular network device and command performed by that particular network device. At 520, the management device 200 supplies the combination of the CLI output and the XML definitional file to the output parser to parse the output. At 530, the XML based parser generates a report based on a selected XML report file and creates a run-time version of the XML report.

For example, on the management device, the module parsing the output received from a network device runs on a server engine. The server engine parses the text file (i.e., XML file), and obtains the data in the output received from the network device. There is no need to write a parser for all the numerous different operation commands, which can change or be different across network devices and different software versions on network devices. Since the parsing of the output from the network device is performed using XML text files with a predefined grammar, adding new files (in the event a new show command is defined) is rather simple, and does not require any additional work, other than placing the XML file for that network device in a location accessible for selection.

The technique depicted by FIG. 5 can be used to generate different reports. Examples of these reports include network device reports, service reports, compliance and audit reports, lifecycle management reports, and traffic flow reports. When the operation commands are status or show commands, the output generated by the network device for the command provides a wealth of information and that information is processed by the management device to check the network device health and the overall health of the network.

Currently there is no easy way to parse the "show <command>" outputs to gather the required information from a network device, such as the show commands that may be generated by the show commands module 230 shown in FIG. 2. Each "show command" has a different format and a different parser needs to be written to parse the output from different network devices. Supporting a new "show command" requires considerable amount of work and code change. The techniques described in connection with FIG. 5 simplify the process of parsing status command outputs and also adding support for new commands.

An XML-Schema is defined that can show the command output in an XML format. The XML based parser takes the XML file and the output of the command and fetches the information as defined by the XML file. The XML Schema file defines different attributes in a command output. This technique allows for parsing of show command output in an extendible way, and consequently provides an application with a wealth of knowledge that is otherwise buried in command output received from a network device, without a user having to parse the CLI output. Different standards bodies define different types of reports, and the techniques described herein allow for generating these reports in a flexible manner. For example, reports for PSIRT, HIPAA, PCI and Field Notices, can be readily generated using these techniques.

Network devices provide various services (also called features) to be configured on them in order to make use of these features in establishing and maintaining networks. These features could be simple features or more advanced features. Some examples of the features available on network devices are, "SNMP Agent", "BGP Routing", "Network Address Translation (NAT)."

Even though several parameters of these network services are independent of the vendor manufacturing these devices, operating system and firmware executed on the device, each of the services has a different manner of configuration. For example, configuring a BGP Routing feature on a network device manufactured by Vendor A is different from network devices manufactured by Vendor B even though the general concepts of how BGP works are the same across all vendors. There is no easy way for users to be able to view the current configurations or to provision these features across devices of multiple vendors and multiple releases of operating systems without knowing the intricate details of the user interfaces for those devices.

FIG. 6A illustrates output of a show inventory command supplied to a switch device and its associated connected devices. Set forth blow is the XML parser code to parse that output.

```
<?xml version="1.0" encoding="UTF-8"?>
<Command xmlns:xsi="http://www.w3.org/2001/XMLSchema-instance"
xsi:noNamespaceSchemaLocation="showCommands.xsd">
    <VersionSelectorRefs>
        <VersionSelectorRef>c2600ios</VersionSelectorRef>
        <VersionSelectorRef>c2600ios12_3</VersionSelectorRef>
    </VersionSelectorRefs>
    <Cli>show interface</Cli>
    <ParserFileName> showPixInterfaces </ParserFileName>
    <AttributeList context="InterfaceName">
        <Cordinality>REPEAT</Cordinality>
        <Attribute>
            <AttributeName>InterfaceName</AttributeName>
            <AttributeType>STRING</AttributeType>
            <AttributeWordCount>1</AttributeWordCount>
            <Grammer>
                <Rule operator="NextTo">
                    <Anchor>
                        <String>Interface</String>
                    </Anchor>
                </Rule>
            </Grammer>
        </Attribute>
        <Attribute>
            <AttributeName>InterfaceType</AttributeName>
            <AttributeType>STRING</AttributeType>
            <AttributeWordCount>1</AttributeWordCount>
            <StripChars>"</StripChars>
            <Grammer>
                <Rule operator="NextTo">
                    <Anchor>
                        <String>$InterfaceName</String>
                    </Anchor>
                </Rule>
            </Grammer>
        </Attribute>
        <Attribute>
            <AttributeName>AdminStatus</AttributeName>
            <AttributeType>STRING</AttributeType>
            <AttributeWordCount>1</AttributeWordCount>
            <StripChars>,</StripChars>
            <Grammer>
                <Rule operator="NextTo">
                    <Anchor>
                        <String>is</String>
                    </Anchor>
                </Rule>
                <Rule operator="Until">
                    <Anchor>
                        <String>line </String>
                    </Anchor>
                </Rule>
            </Grammer>
        </Attribute>
        <Attribute>
            <AttributeName>OperStatus</AttributeName>
            <AttributeType>STRING</AttributeType>
            <AttributeWordCount>1</AttributeWordCount>
            <Grammer>
                <Rule operator="NextTo">
                    <Anchor>
                        <String>protocol is</String>
                    </Anchor>
                </Rule>
            </Grammer>
        </Attribute>
        <Attribute>
            <AttributeName>Speed</AttributeName>
            <AttributeType>INTEGER</AttributeType>
            <AttributeWordCount>1</AttributeWordCount>
            <Grammer>
                <Rule operator="NextTo">
                    <Anchor>
                        <String>BW</String>
                    </Anchor>
```

-continued

```
                </Rule>
            </Grammer>
        </Attribute>
        <Attribute>
            <AttributeName>MacAddress</AttributeName>
            <AttributeType>STRING</AttributeType>
            <AttributeWordCount>1</AttributeWordCount>
            <StripChars>,</StripChars>
            <Grammer>
                <Rule operator="NextTo">
                    <Anchor>
                        <String>MAC address</String>
                    </Anchor>
                </Rule>
            </Grammer>
        </Attribute>
        <Attribute>
            <AttributeName>InternetAddress</AttributeName>
            <AttributeType>STRING</AttributeType>
            <AttributeWordCount>1</AttributeWordCount>
            <StripChars>,</StripChars>
            <Grammer>
                <Rule operator="NextTo">
                    <Anchor>
                        <StartsWith>IP</StartsWith>
                        <EndsWith>address</EndsWith>
                    </Anchor>
                </Rule>
            </Grammer>
        </Attribute>
        <Attribute>
            <AttributeName>NetMask</AttributeName>
            <AttributeType>STRING</AttributeType>
            <AttributeWordCount>1</AttributeWordCount>
            <Grammer>
                <Rule operator="NextTo">
                    <Anchor>
                        <String>subnet mask</String>
                    </Anchor>
                </Rule>
            </Grammer>
        </Attribute>
    </AttributeList>
</Command>
```

Figure 6B:
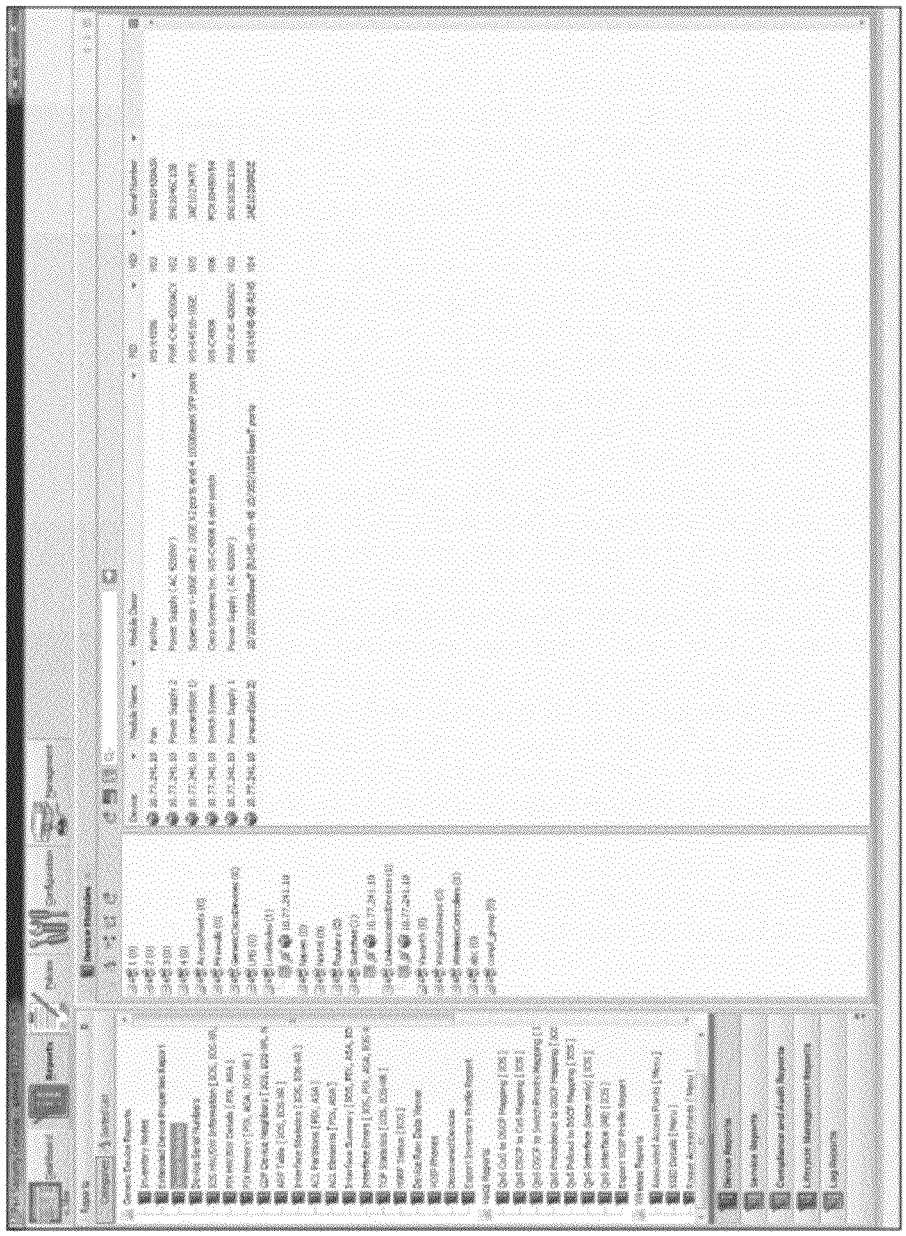
FIG. 6B is a graphical user interface display screen-shot showing an example of a generated report using an XML report generation parser.

FIG. 6B is a graphical user interface screen-shot that illustrates an example of a report generated using the XML parser code set forth above, that generates a presentation of the output in a more user friendly graphical user interface format.

Figure 7:
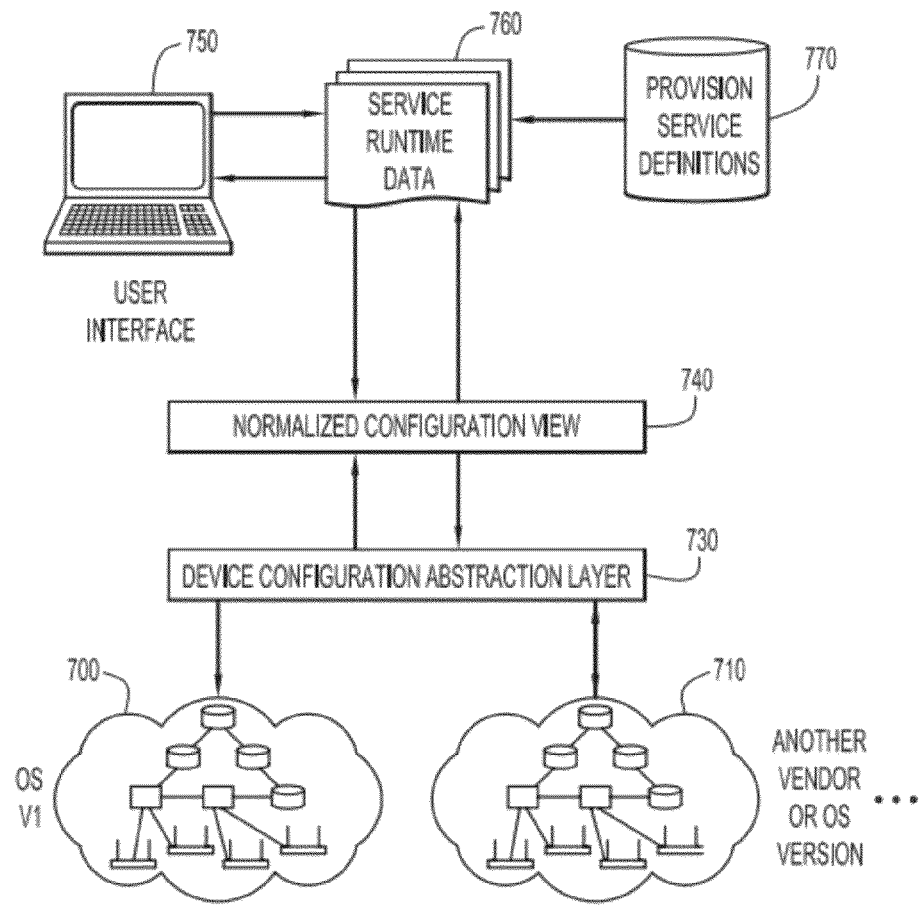
FIG. 7 is a diagram showing configuration of services according to techniques described herein.

Reference is now made to FIG. 7 that shows a diagram depicting techniques for configuration of services on a network device. The data structures and operations depicted by FIG. 7 may be defined and performed by the configurations command module 240 shown in FIG. 2. FIG. 7 shows two different underlying networks 700 and 710 by way of example. There may be more than two networks with varied configurations. Network 700 includes network devices that operate according to a first version of an operating system (OS), e.g., "OS v1" and network 710 includes network devices that operate according to another vendor OS or a different version of the same OS used by network devices in network 700. The overlaying architecture remains consistent across different networks.

A device configuration abstraction layer 730 is provided that defines different network devices and the configuration commands a network device can accept for a given network. These network devices are defined as text files in XML format using a pre-defined XML Schema. A normalized configuration view 740 represents existing device configuration in XML format that can then be presented to a user using a graphical user interface, e.g., user interface 750 (display/monitor of a network management device, in one example). The user interface 750 receives the current configuration, which is designated as service runtime data of an existing network. The current configuration is divided into different feature sets called "services." Provision service definitions 770 are used to generate the normalized configuration view 740 from the service runtime data 760.

The techniques to define various network device features can be represented in an abstract XML format that is independent of the command syntaxes and semantics of how these features are actually configured on the network devices. According to these techniques, there are three types of XML files. The first type is Definition XML files which define the meta or static information of each service. i.e., the definition of a service and its attributes. For example, BGP Routing has attributes of BGP Process identifier (ID), neighbor ID, BGP global attributes, etc. The second type is a Runtime XML file that contains the actual values of attributes configured or to be configured on the network device for a given service. The third type is a Decorator XML file that contains information about how a user interface should render these attributes, how to group the attributes, hints on laying out these attributes etc. The Service Definition XML also defines the relationships between various attributes within a service or across different services. These relationships may help validate the values in a Runtime XML to ensure that the runtime values are accurate. The Service Definition XML also defines the constraints of a given attribute. For example, minimum and maximum values allowed for that attribute. Thus, the network management device stores in its memory 206 (FIG. 2), definition XML files, runtime XML files and decorator XML files.

A graphical user interface (GUI) can be automatically created from the Service Definition XML files. The GUI engine parses the Service Definition XML files and lays out the GUI attributes for presentation to a user. Using the three different XMLs, a GUI is automatically presented to the user without having to write customized user interface software for each of these services separately.

A partial listing of the Definition XML file for a "logging" service is as follows:

```
<?xml version="1.0" encoding="UTF-8" ?>
- <Service xmlns="http://www.parinetworks.com/schemas/1.0"
     xmlns:pariver="http://www.parinetworks.com/versiontypes/1.0"
     identifier="Logging">
- <PlatformDefinitions>
- <pariver:OS identifier="os.cisco.ios.12.2(8).later">
    <pariver:Description>Cisco IOS Version 12.2(8)
       releases</pariver:Description>
    <pariver:Extends>os.cisco.ios</pariver:Extends>
    <pariver:Level>12</pariver:Level>
- <pariver:IOSVersionInfo>
- <pariver:Version>
- <pariver:Name>
    <pariver:Major>12</pariver:Major>
    <pariver:Minor>2</pariver:Minor>
    <pariver:ReleaseIdentifier>8</pariver:ReleaseIdentifier>
    </pariver:Name>
    <pariver:Operator>GreaterThanEquals</pariver:Operator>
    </pariver:Version>
    </pariver:IOSVersionInfo>
    </pariver:OS>
- <pariver:OS identifier="os.cisco.ios.12.2(15)T.later">
    <pariver:Description>Cisco IOS Version 12.2(15)T and later
       releases</pariver:Description>
    <pariver:Extends>os.cisco.ios</pariver:Extends>
    <pariver:Level>12</pariver:Level>
- <pariver:IOSVersionInfo>
- <pariver:Version>
- <pariver:Name>
    <pariver:Major>12</pariver:Major>
    <pariver:Minor>2</pariver:Minor>
    <pariver:ReleaseIdentifier>15</pariver:ReleaseIdentifier>
    </pariver:Name>
    <pariver:Operator>GreaterThanEquals</pariver:Operator>
    </pariver:Version>
    </pariver:IOSVersionInfo>
    </pariver:OS>
- <pariver:Platform identifier="ios_logging_count">
    <pariver:Description>Any Cisco device with IOS Version
       12.2.x</pariver:Description>
    <pariver:OSReference>os.cisco.ios.12.2(8).later</pariver:OSReference>
    </pariver:OSReference>
    </pariver:Platform>
- <pariver:Platform identifier="ios_xml_logging">
    <pariver:Description>Any Cisco device with IOS Version 12.2(15)T
       and later</pariver:Description>
    <pariver:OSReference>os.cisco.ios.12.2(15)T.later</pariver:OSReference>
    </pariver:OSReference>
    </pariver:Platform>
    </PlatformDefinitions>
- <VersionSelectorRefs>
    <VersionSelectorRef>ios</VersionSelectorRef>
    <VersionSelectorRef>pix_7_later</VersionSelectorRef>
    <VersionSelectorRef>ios_logging_count</VersionSelectorRef>
    <VersionSelectorRef>ios_xml_logging</VersionSelectorRef>
    </VersionSelectorRefs>
+ <ServiceProperties>
+ <ServiceAttributeList>
- <RelationshipList>
```

A partial listing of a Decorator XML for the logging service is as follows:

```
<ServiceDecorator
   xmlns="http://www.parinetworks.com/schemas/1.0">
<Properties>
<ServiceRef>Logging</ServiceRef>
<Title>Logging</Title>
   </Properties>
<AttributeDecoratorList>
<AttributeDecorator identifier="State">
<AttributeProperties>
<AttributeRef>State</AttributeRef>
<DisplayName>State</DisplayName>
   </AttributeProperties>
<FormProperties>
<Label>Enable</Label>
<LabelVisible>true</LabelVisible>
<ControlType>CheckBox</ControlType>
   </FormProperties>
<TableProperties>
<ColumnName>State</ColumnName>
   </TableProperties>
   </AttributeDecorator>
<AttributeDecorator identifier="LoggingBuffer">
<AttributeProperties>
<AttributeRef>LoggingBuffer</AttributeRef>
<DisplayName>Logging Buffer</DisplayName>
   </AttributeProperties>
<FormProperties>
<Label>Enable</Label>
<LabelVisible>true</LabelVisible>
<ControlType>CheckBox</ControlType>
   </FormProperties>
<TableProperties>
<ColumnName>Logging Buffer</ColumnName>
   </TableProperties>
   </AttributeDecorator>
<AttributeDecorator identifier="XMLLoggingBuffer">
<AttributeProperties>
<AttributeRef>XMLLoggingBuffer</AttributeRef>
<DisplayName>XML Logging Buffer</DisplayName>
   </AttributeProperties>
<FormProperties>
<Label>Enable</Label>
<LabelVisible>true</LabelVisible>
<ControlType>CheckBox</ControlType>
   </FormProperties>
<TableProperties>
```

```
            <ColumnName>XML Logging Buffer</ColumnName>
          </TableProperties>
        </AttributeDecorator>
    =   <AttributeDecorator identifier="BufferSize">
    =     <AttributeProperties>
            <AttributeRef>BufferSize</AttributeRef>
            <DisplayName>Buffer Size</DisplayName>
          </AttributeProperties>
    =     <FormProperties>
            <Label>Size</Label>
            <LabelVisible>true</LabelVisible>
            <ControlType />
          </FormProperties>
    =     <TableProperties>
            <ColumnName>Buffer Size</ColumnName>
          </TableProperties>
        </AttributeDecorator>
```

Figure 8:
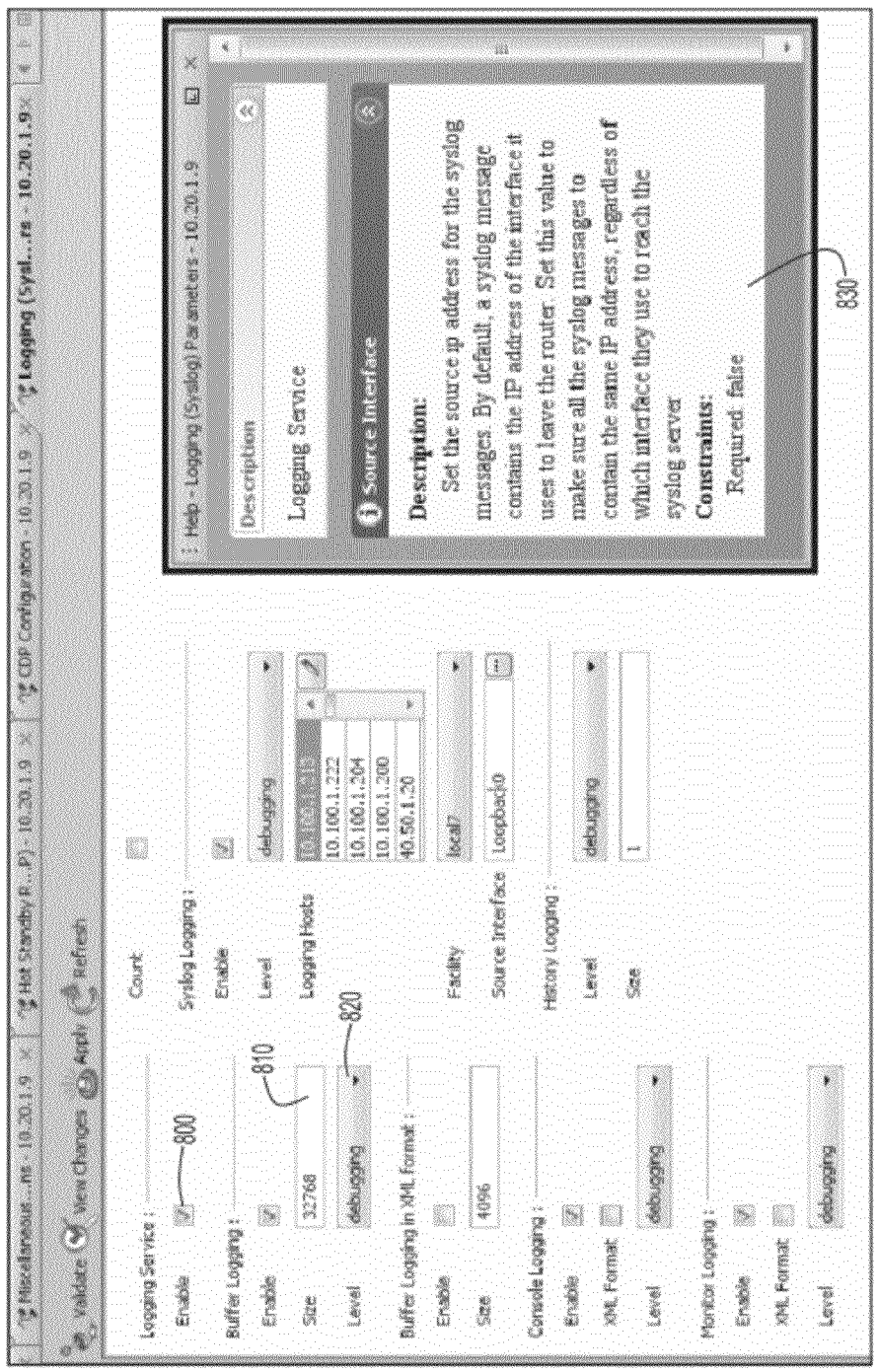
FIG. 8 is a graphical user interface screen-shot showing an example of an input Hypertext Markup Language (HTML) page generated using an XML file to obtain user input.

FIG. 8 is a graphical user interface screen-shot showing an example of a normalized configuration view of a logging service feature for a network device. The check boxes 800, blank fields 810, drop-down menus 820, values in the drop-down menus, etc., are all defined by the three XML files described above. In addition, the help explanation shown at 830 is also defined by the XML files.

The advantages of managing services using the techniques depicted by FIGS. 7 and 8 are independent of the vendor, operating system or firmware versions of the network devices. A GUI configuration screen is automatically created to allow a user to quickly visualize current configurations of these features on the devices, make changes to the settings, and configure and provision features on network devices without the user having to know the complex syntaxes used in a typical CLI command. The use of XML files can automate provisioning of network features on devices uniformly instead of generating CLIs for each type of device or OS version. It becomes much easier to port and migrate configurations from one platform of network devices to a completely different platform.

Figure 9:
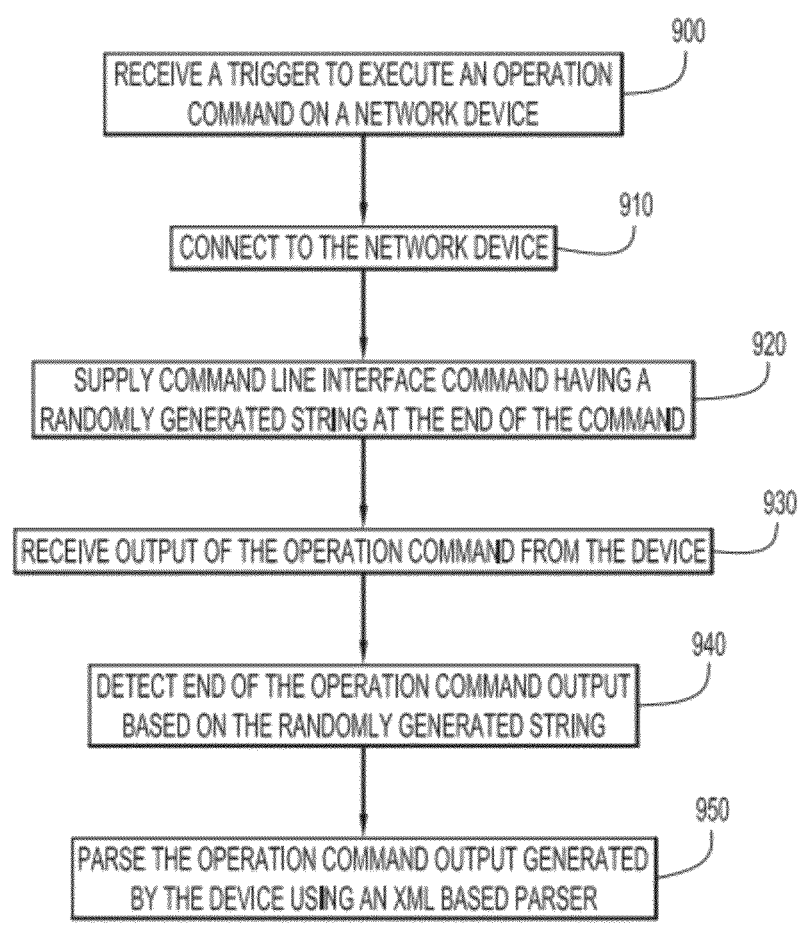
FIG. 9 is a flow chart showing operations involved in network management and/or configuration of one or more network devices using a flexible XML based parser.

Reference is now made to FIG. 9 that shows a flow chart depicting the operations involved in network management and/or configuration of one or more network devices using a flexible XML based parser. At 900, the management device receives a trigger to execute an operation command on a network device. At 910, the management device connects to the network device. At 920, the management device supplies a CLI command for execution of the operation command, with a randomly generated unique string being included at the end of the command. At 930, the management device receives output of the operation command from the network device. At 940, the management device detects the end of the operation command output based on the randomly generated string. At 950, the operation command output is parsed using an XML based parser.

The above description is intended by way of example only. Various modifications and structural changes may be made therein without departing from the scope of the concepts described herein and within the scope and range of equivalents of the claims.

What is claimed is:

1. A method of managing network devices in a network, the method comprising:
receiving a trigger for an operation command to be executed by a network device;
connecting to the network device;
supplying to the network device a command line interface command for execution of the operation command, a randomly generated string being included at the end of the command line interface command;
receiving the output of the operation command from the network device;
detecting an end of the operation command output based on the randomly generated string; and
parsing the operation command output generated by the device using an XML based parser.

2. The method of claim 1, wherein supplying comprises supplying the command line interface command, followed by a carriage return followed by the randomly generated string.

3. The method of claim 1, and further comprising configuring the XML based parser to parse different operation command outputs with XML files using anchors and regular expressions irrespective of whether the operation command output is free style or in tabular form.

4. The method of claim 1, wherein the trigger is automatically scheduled or based on user input.

5. The method of claim 1, wherein the network comprises two or more network devices with different operating system versions.

6. The method of claim 1, wherein the network comprises network devices from different vendors.

7. The method of claim 1, wherein the operation command is a show command.

8. The method of claim 1, further comprising:
supplying output from the XML based parser to an XML based report generator function;
generating one or more reports with the XML based report generator function from the output of the XML based parser; and
displaying the reports to a user via a web interface, email, console or graphical user interface.

9. The method of claim 8, wherein displaying comprises displaying at least one of: a device report, a service report, a configuration report, a life cycle management report, a compliance and audit report, and a traffic flow report.

10. The method of claim 1, wherein the operation command is a configuration command for configuring a function or attribute of a function of the network device.

11. The method of claim 10, further comprising receiving, using an XML based configuration parser, user input on the operation command to be executed.

12. The method of claim 10, further comprising configuring a service on the device based on the configuration command.

13. The method of claim 10, further comprising storing definition XMLs files each defining static information of a service, runtime XML files containing values of attributes to be configured on a network device for a service, and decorator XML files that contains information about how a user interface should render the attributes for a service, and automatically creating a graphical user interface screen by parsing the service definition XML files to lay out attributes for graphical user interface presentation to a user.

14. An apparatus comprising:
a network interface unit configured to enable communications over a network;
a memory;
a processor coupled to the network interface unit and the memory, the processor configured to:
receive a trigger for an operation command to be executed on one or more network devices in the network;
establish a connection to one or more network devices in the network;

generate a command line interface command for execution of the operation command by one or more network devices, a randomly generated string being included at the end of the command line interface command;

send the command line interface command over the network in order to invoke the operation command on one or more network devices on the network;

receive output of the operation command from one or more devices;

detect an end of the operation command output based on the randomly generated string; and parse the operation command output generated by the device using an XML based parser.

15. The apparatus of claim 14, wherein the processor is configured to supply the command line interface command, followed by a carriage return followed by the randomly generated string.

16. The apparatus of claim 14, wherein the processor is further configured to parse different operation command outputs with XML files using anchors and regular expressions irrespective of whether the operation command output is free style or in tabular form.

17. The apparatus of claim 14, wherein processor is configured to respond to the trigger that is automatically scheduled or based on user input.

18. The apparatus of claim 14, wherein the operation command is a show command.

19. The apparatus of claim 18, wherein the processor is further configured to:

supply output of the XML based parser to an XML based report generator function in order to generate one or more reports; and display the reports to a user via a web interface, email, console or graphical user interface.

20. The apparatus of claim 14, wherein the operation command is a configuration command for configuring a function or attribute of a function of the one or more network devices.

21. The apparatus of claim 20, wherein the processor is further configured to receive, using an XML based configuration parser, user input on the operation command to be executed.

22. The apparatus of claim 20, wherein the processor is configured to generate information that configures a service on the one or more network devices device based on the configuration command.

23. The apparatus of claim 20, wherein the memory is configured to store definition XMLs files each defining static information of a service, runtime XML files containing values of attributes to be configured on a network device for a service, and decorator XML files that contains information about how a user interface should render the attributes for a service, and the processor is configured to automatically generate a graphical user interface screen by parsing the service definition XML files in order to lay out attributes for graphical user interface presentation to a user.

24. One or more non-transitory computer readable storage media encoded with executable instructions that, when executed by a processor, are operable to:

receive a trigger for an operation command to be executed on one or more network devices in a network;

establish a connection to one or more network devices in the network;

generate a command line interface command for execution of the operation command by one or more network devices, a randomly generated string being included at the end of the command line interface command;

send the command line interface command over the network in order to invoke the operation command on one or more network devices on the network;

receive output of the operation command from one or more devices;

detect an end of the operation command output based on the randomly generated string; and parse the operation command output generated by the device using an XML based parser.

25. The non-transitory computer readable storage media of claim 24, wherein the instructions operable to supply comprise instructions operable to supply the command line interface command, followed by a carriage return followed by the randomly generated string.

26. The non-transitory computer readable storage media of claim 24, and further comprising instructions operable to:

supply output of the XML based parser to an XML based report generator function in order to generate one or more reports; and generate data to display the reports to a user via a web interface, email, console or graphical user interface.

27. The non-transitory computer readable storage media of claim 24, and further comprising instructions operable to receive, via an XML based configuration parse, user input on the operation command to be executed.

28. The non-transitory computer readable storage media of claim 24, and further comprising instructions operable to store definition XMLs files each defining static information of a service, runtime XML files containing values of attributes to be configured on a network device for a service, and decorator XML files that contains information about how a user interface should render the attributes for a service, and instructions operable to automatically generate a graphical user interface screen by parsing the service definition XML files in order to lay out attributes for graphical user interface presentation to a user.

* * * * *